July 4, 1950          H. COLE          2,513,625
MULTICOMPARTMENT CONDIMENT HOLDER
Filed May 3, 1949
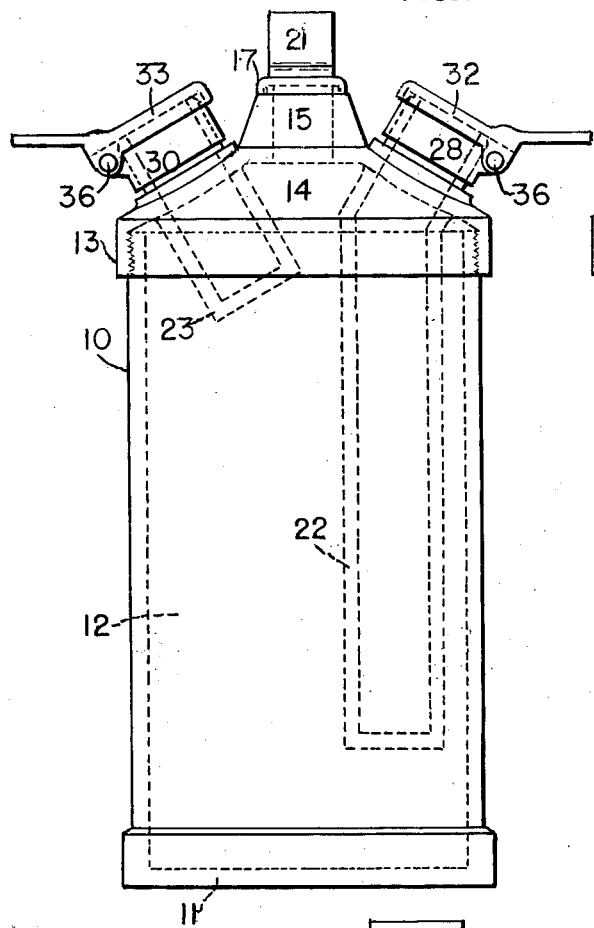
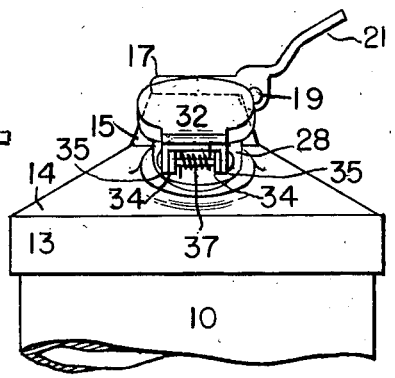
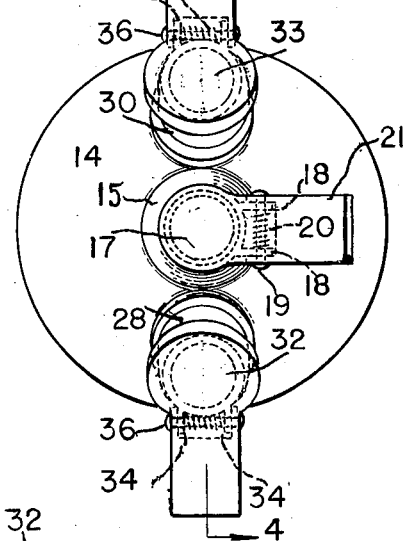
INVENTOR.
HERBERT COLE,
BY
Arthur F. Randall
atty.

Patented July 4, 1950

2,513,625

UNITED STATES PATENT OFFICE 2,513,625

MULTICOMPARTMENT CONDIMENT HOLDER

Herbert Cole, Boston, Mass.

Application May 3, 1949, Serial No. 91,090

4 Claims. (Cl. 222—129)

This invention relates to condiment holders and particularly to a condiment dispensing holder for a plurality of condiments including salt, pepper and sugar, an object of the invention being to provide a holder of the class described with a plurality of normally closed non-communicating compartments which are adapted to contain salt, pepper and sugar, respectively, and from either of which its contents may be manually delivered in regulated fashion by opening said compartment and shaking the device.

Accordingly I have provided a condiment holder of the class and type described comprising a relatively large hollow sugar-holding body element to be seated in upstanding position upon a table or other support, said body element having separably connected with its upper end a removable cover element constructed with an outlet for sugar and also with tubular salt and pepper compartments each of which extends downwardly into the interior of the body element and is closed at its lower end. The upper ends of both tubular compartments and said outlet are each equipped with a pivotally supported finger-operated closure lever that is normally maintained in its closed position by a spring. Thus, while using the holder it may be held inverted by one hand and either of its three closure levers may be controlled and operated by a finger of the same hand to deliver condiment from either compartment thereof.

Other features of the invention will hereinafter appear.

In the accompanying drawing:

Figure 1 is a side elevation of a condiment holder constructed in accordance with this invention.

Figure 2 is an elevation of the upper portion of the holder shown in Fig. 1 as viewed from another side.

Figure 3 is a top plan view of the holder shown in Figs. 1 and 2.

Figure 4 is an enlarged section on line 4—4 of Fig. 3.

The illustrated embodiment of the invention comprises a relatively large transparent tubular body element 10 which is interiorly and exteriorly cylindrical and provided at its lower end with a bottom wall 11, the interior of said body element providing a compartment 12 for holding a relatively large volume of sugar.

The upper end portion of the body 10 is exteriorly threaded to receive thereon the interiorly threaded skirt 13 of a cap 14 whose top wall is made approximately conical inside and outside and formed at its center with a tubular boss 15 whose interior provides an outlet port 16 for chamber 12. Normally the outer end of the port 16 is closed by a pivoted closure lever 17, Fig. 4, while the inner end of said port communicates with chamber 12.

Closure lever 17 is pivotally connected to a pair of lugs 18, Fig. 3, projecting laterally from one side of boss 15 by means of a pintle 19 on the intermediate portion of which is mounted a coiled spring 20. One end of this spring bears against boss 15 while its opposite end engages the closure lever 17 to yieldingly hold one arm of the same normally seated upon the top of boss 15 to close outlet port 16. Closure lever 17 is made with a finger actuated arm 21 projecting outwardly and obliquely upwardly therefrom by means of which said closure lever is swung away from boss 15 to open outlet port 16 and when said port is thus opened while the device is inverted a stream of sugar is delivered by gravity through the same, as will be obvious.

Within the chamber 12, Figs. 1 and 4, are arranged two longitudinally disposed tubular members 22 and 23 whose lower ends are closed, the interior of the former providing a compartment 24 for holding a supply of salt and the interior of the latter providing a compartment 25 for holding a supply of pepper, the upper end of the compartment 24 being in register with the lower end of the interior of an exteriorly threaded nipple 26 extending obliquely upwardly from and perpendicular to the conical wall of cap 14 at one side of the boss 15 and the upper end of the compartment 25 being in register with the lower end of the interior of an exteriorly threaded nipple 27 extending obliquely upwardly from and perpendicular to the conical wall of cap 14 at the opposite side of boss 15.

The nipple 26 has screwed thereon the interiorly threaded skirt of a cap 28 whose top wall is formed with a multiplicity of outlet apertures 29 while the nipple 27 has screwed thereon the interiorly threaded skirt of a cap 30 whose top wall is also formed with a multiplicity of outlet apertures 31.

Normally the outer ends of the apertures 29 of cap 28 are closed by one of the arms of a pivotally supported closure lever 32 that is seated upon said cap, while the outer ends of the apertures 31 of cap 30 are closed by one of the arms of a pivotally supported closure lever 33, said last-mentioned arm being seated upon said cap 30.

Each cap 28 and 30 is made with a pair of spaced-apart laterally projecting apertured lugs 34, Figs. 3 and 4, disposed between a pair of apertured lugs 35 projecting downwardly from the proximate closure lever and to which they are pivotally connected by a pintle 36 occupying the apertures of all four lugs. A coiled spring 37 mounted upon each pintle between each pair of lugs 34 bears at its one end against the skirt of the proximate cap and at its opposite end against its associated closure lever and said spring, being installed under initial stress, serves to yieldingly hold its closure lever in aperture-closing position.

The tubular members 22 and 23 occupy positions within the chamber 12 free and clear of the cylindrical wall surrounding the same so that when the body 10 is filled with sugar the latter surrounds said members. This construction has the advantage that should the sugar within body 10 cake, it can be broken up to a substantial extent by rotating cap 14 and said members 22 and 23. Also it is an advantage that lumps of sugar forming within the body 10 may be broken up by shaking the latter and causing said lumps to impinge upon the tubular members 22 and 23.

It is an advantageous feature of the device that by holding open both closure levers 32 and 33, both salt and pepper can be delivered at the same time, or if only one closure lever is held open then there is no mixing of the two condiments.

The above described construction also provides for easily cleaning all parts of the interior of the device and permitting the different compartments to be filled with ease and dispatch.

The above described construction also provides for removal of the caps 28 and 30 when access is to be had to the interiors of the tubular members 22 and 23, and as will be clear the closure levers 32 and 33, being mounted on said caps, are removed with the latter.

What I claim is:

1. A condiment holder comprising a relatively large hollow body element that is closed at one end by a bottom wall and adapted to be supported in an upstanding position upon a table or other support; a cover separably connected with the top of said body element and having an interiorly conical top wall provided at its middle with an outlet that is extended through an upstanding centrally disposed boss formed upon the exterior of said cover, the top of said boss providing a seat for one arm of a closure lever; a closure lever pivotally connected intermediate its opposite ends to said boss at one side thereof; a spring for yieldingly holding said closure lever arm seated upon said boss; a tubular condiment holder within said body element connected adjacent to its one end with the top wall of said cover at one side of the outlet thereof, said tubular holder being closed at its lower end and provided at its upper end with a plurality of outlet apertures; a second tubular condiment holder within said body element connected adjacent to its one end with the top wall of said cover at another side of the outlet thereof, said second tubular holder being also closed at its lower end and provided at its upper end with a plurality of outlet apertures; two closure levers, each associated with the outlets of one of said tubular holders and pivotally supported intermediate its opposite ends by said cover, and two springs each yieldingly holding one of said two closure levers in its outlet-closing position.

2. A condiment holder according to claim 1 wherein the interior of each tubular condiment holder communicates adjacent to its upper end with the interior of a tubular exteriorly threaded nipple provided upon the exterior of the top wall of said cover at one side of said boss; wherein an interiorly threaded cap provided with an apertured top wall is screwed into position upon each nipple, and wherein the apertured top wall of each cap serves as a seat for an arm of the closure lever associated with said cap.

3. A condiment holder according to claim 2 wherein the closure lever of each tubular holder is pivotally mounted upon the cap of the latter.

4. A condiment holder according to claim 2 wherein the closure lever of each tubular holder is pivotally connected to the cap of the latter by a pintle, and wherein the spring associated with said closure lever is a coiled spring through which said pintle extends with one end of said spring bearing against said cap and its opposite end bearing against said closure lever.

HERBERT COLE.

No references cited.